Patented Feb. 8, 1949

2,461,147

UNITED STATES PATENT OFFICE 2,461,147

DEHYDROGENATION PROCESS

Elwyn P. Davies, Alameda, and Frank T. Eggertsen, Oakland, Calif., assignors to Shell Development Company, San Francisco, Calif., a corporation of Delaware No Drawing. Application April 24, 1946, Serial No. 664,705

4 Claims. (Cl. 260—680)

1

This invention relates to a process for the dehydrogenation of hydrocarbons characterized by the use of special catalysts under special conditions.

The process of the invention is particularly advantageous for the catalytic dehydrogenation of olefins to corresponding diolefins and the dehydrogenation of alkyl aromatic hydrocarbons such as ethyl benzene to the corresponding vinyl aromatic compounds such as styrene, and these aspects of the invention represent preferred embodiments which will be used to illustrate the invention throughout the following description.

The field of catalytic dehydrogenation of hydrocarbons, and particularly the production of diolefins and vinyl aromatic compounds by dehydrogenation is of considerable technical importance, and a number of processes and improvements have been suggested in the art. A few of the more pertinent processes are those described in the following United States patents: Roetheli et al., 2,376,191; Grosskinsky et al., 2,265,641; Fulton et al., 2,383,643; Bosch, 1,271,013; Thacker et al., 2,211,219; Graves 2,036,410; Wulff, 1,986,241; Kearby, 2,370,797; Kearby, 2,370,798. As indicated by these patents, these dehydrogenation reactions may be effected with a wide variety of catalysts. As a matter of fact there is no difficulty in finding numerous catalysts having almost any desired activity. None of the known catalysts, however, are capable of effecting dehydrogenation in a perfectly selective manner, particularly when dehydrogenating olefins to the corresponding diolefins. In all cases an appreciable amount of the hydrocarbon feed and/or reaction product is reacted by cracking, polymerization, and/or oxidation to give side reaction products which cause complications due to fouling of the catalyst and making the separation of the desired product more difficult. In the dehydrogenation of normal butylenes to butadiene for example, it is most difficult to obtain a conversion efficiency or selectivity (i. e. percent of feed reacted which is converted to the desired product) above about 70 percent, except at low conversions.

Vinyl substituted aromatic hydrocarbons such as styrene and particularly diolefins such as butadiene and isoprene may be produced in better yields by catalytic dehydrogenation of the corresponding alkyl aromatic hydrocarbons or olefins with catalysts prepared in the particular manner hereinafter described. Thus, the improved results are due to the use of catalysts having improved properties, which properties are in turn due to the method of catalyst preparation. One of the outstanding differences between the physical properties of the catalysts prepared as described herein and the catalysts of the same chemical analysis prepared by the usual methods is in the density of the catalyst pellets. However, the present knowledge of catalysis in this field is on an empirical basis and quite meager. Therefore, while this difference undoubtedly is important, it is probably not the sole factor involved.

The catalysts used in the process of the present invention are used in the form of regular formed particles hereinafter referred to as pellets. Such pellets are for example small cylinders of from about $\frac{1}{16}$ inch to $\frac{3}{4}$ inch diameter and $\frac{1}{16}$ inch to 1 inch in length. The catalysts may vary widely in composition. In general, any of the catalyst compositions such as those specifically mentioned in the above cited patents may be used. These catalysts constitute the class generally known as metal oxide dehydrogenation catalysts. These catalysts may consist of only 2 components or may comprise 5 or more components; however, in general the catalyst consists of 3 or 4 components. The components of a preferred group of catalysts are as follows: (1) A major active component consisting of one or a mixture of oxides of one or more of the following metals: Fe, Co, Mn, Cr, and Zn; (2) A promoter consisting of one or more alkali metal compounds. Potassium and rubidium compounds are the most active promoters. Suitable compounds include the oxides, hydroxides, carbonates, bicarbonates, fluorides, nitrates, phosphates, borates, acetates. (The above relates to the compounds used in preparing the catalyst. The actual composition under conditions of use may differ.) (3) A stabilizer consisting of an oxide of one or more of the following metals: Al, Mg, Be, Ca, Ba, Sr, Cr, Mn, Bi, Ce, Sn. These metal oxides may be incorporated per se in the catalyst or they may be formed therein during the catalyst preparation from primary compounds such as the hydroxides, carbonates, nitrates, acetates, etc. In general they are present as separate compounds, but in some cases may be chemically bound with one or more of the remaining constituents; (4) A second promoter consisting of one or more compounds of one or more of the following metals: Cu, Ag, Cd, Th; (5) A diluent material such as alumina, magnesia, zirconia, beryllia or asbestos.

It will be noted that there is a certain amount of overlapping. Thus, manganese oxide or chromium oxides in constituents 1 and 2 and alumina, magnesia and beryllium oxide in constituents 3 and 5. These latter materials exert a definite influence on the catalytic activity and stability and are considered as diluents only when used in large amounts such for example as 40 percent by weight or more of the catalyst.

The major active constituent 1 is an essential constituent which is the major constituent with the possible exception of a diluent and is preferably in excess of all other constituents combined. The promoter 2 is likewise an essential constituent. It may be used in relatively small amounts of say 0.5 percent by weight of the catalyst up to 50 percent by weight or more. A preferred range is between about 5 percent and 35 percent of the catalyst. The stabilizing constituent 3 is not essential in all cases but is preferably included. In some cases concentrations of only about 1 percent by weight are effective and in other cases concentrations up to about 30 or 40 percent are useful. The concentration is, however, generally not particularly critical and concentrations between about 2 percent and 20 percent usually give excellent results. It will be noted that component 3 is generally a minor component with respect to component 1 and component 2. The second promoter 4 is not essential, but may be advantageously incorporated in small amounts (for example 0.1–5 percent) in some cases. These promoters appear to improve the catalyst by increasing the rate at which carbon dioxide is desorbed under the operating conditions. The diluent 5 as stated above is not essential. The catalysts may of course contain minor amounts of lubricants and/or binding material.

Of these catalysts, a preferred subgroup contains iron oxide as the major constituent with potassium oxide as the next major constituent and contains a minor amount of a stabilizer 3. A few preferred catalyst compositions are given in the following table:

|  | 1 | 2 | 3 | 4 | 5 | 6 | 7 | 8 |
|---|---|---|---|---|---|---|---|---|
| $Fe_2O_3$ | 87 |  | 40 | 84 | 50 | 64 | 84 | 60 |
| ZnO |  |  | 10 | 5 | 30 |  |  |  |
| $Cr_2O_3$ | 2 | 67 |  |  | 3 | 4 | 3 |  |
| $K_2O$ | 10 | 30 | 10 | 5 | 15 | 32 | 10 | 25 |
| $Al_2O_3$ |  |  |  |  |  |  | 3 |  |
| $Mn_2O_3$ |  |  | 30 |  |  |  |  |  |
| $Bi_2O_3$ |  |  |  |  |  |  |  | 15 |
| MgO |  | 2 | 10 | 5 |  |  |  |  |
| CuO | 1 | 1 |  | 1 | 2 |  |  |  |

These compositions are expressed in the usual method on the basis of the oxides. The potassium in the catalysts is at least partly converted to the carbonate and the iron oxide is at least partly converted to $Fe_3O_4$ under the reaction conditions.

It has been found that the results obtainable with the above described catalysts may be considerably improved for the present purpose, particularly in the matter of selectivity of action, by preparing the catalyst by a modified method which affords catalyst pellets of lower than normal density.

The density per se of the catalyst is not necessarily the controlling factor since some more dense catalysts are more selective than some less dense catalysts. A more important consideration is the density of a catalyst of a given composition. We use as a basis for expressing this density factor, the ratio of the pellet density to the absolute density of the catalyst, i. e. the density of the composite material excluding all pores, voids, cracks, etc. Since the bulk density is close to 0.5 times the pellet density, the ratio of the bulk density to the absolute density may also be used. This ratio is approximately one-half of the pellet density ratio. The absolute densities of some of the preferred catalyst ingredients are:

| | |
|---|---|
| $Fe_2O_3$ | 5.24 |
| ZnO | 2.29 |
| MgO | 3.65 |
| $Al_2O_3$ | 3.9 |
| $Cr_2O_3$ | 5.21 |

A catalyst (fresh) of the composition

| | Percent |
|---|---|
| $Fe_2O_3$ | 87 |
| $K_2CO_3$ | 10 |
| $Cr_2O_3$ | 3 | therefore has an absolute density of approximately 4.65. The pellet densities of the catalysts prepared as hereinafter described are below 0.520 of the absolute densities, and preferably between about 0.320 and 0.460. (The bulk density ratios are below about 0.260 and are preferably between about 0.151 and 0.230.)

Superior catalysts having these densities are produced according to the process of the present invention by an extrusion method wherein the material to be extruded contains a large amount of water (in excess of that applicable with ordinary extrusion methods) and the extrusion is carried out under conditions to cause rapid predrying of the extrudate prior to cutting it into pellets of the desired length. More particularly, at least the major catalyst constituent, for example the iron oxide, is used in the form of a fine powder. This powder is mixed with the remaining catalyst constituents which may be either in the form of powders or in solution and the mixture is made up into a moist mass or paste by the incorporation of the necessary amount of water.

In the range of desired water contents, such pastes form sticky extrudates when extruded by ordinary methods. Pellets formed by cutting this extrudate into suitable lengths are soft, easily deformed, and readily stick together into unusable agglomerates. The minimum water content of the paste which causes sticking of extruded pellets formed therefrom, and the maximum amount of water, which can be used to give an extrudable mixture, depend in part on the state of division of the material in the paste. Thus, colloidal materials can hold more water without yielding sticky extrudates than dispersions of semi-colloidal or less finely-divided solid materials. Likewise, the amounts of water in the moist mass which can be used to yield an extrudate that is sticky and yet sufficiently stable to hold its shape temporarily depends in part on the nature of the ingredients employed. For example, with catalysts containing pigment grade iron oxide powder as the major ingredient, the preferred water content is 20% to 35%, especially 25–30%, although water contents of 45% and 60% have advantageously been used. On the other hand, catalysts containing appreciable amounts of clay material may require 70–80% water to produce the desired paste. In general, water contents are used in the range between the minimum which causes sticking of the extruded pellets and the maximum which may be used to obtain an extrudable material capable after extrusion of holding its shape at least for a short while (e. g., 1/20 to 5 seconds) when not exposed to externally applied deformation pressures. The maximum water content is, in other words, the highest at which a temporarily stable extrudate can be obtained. In contrast to the stickiness of extrudates from the pastes used in the process of the present invention, a mixture of lower water content ordinarily forms non-sticking extrudates.

There may also be incorporated into the paste small amounts of extrusion aids. Thus for example, 0.1 to .2% of such materials as stearic acid, hydrogenated cotton seed oil, tannic acid, extracts containing tannic acids or tannins, e.g. Quebracho extract, etc., may be added to modify the rheological properties of the added to modify the rheological properties of the mixture to aid in the extrusion. Likewise the moist mass may contain materials which increase the strength of the partially-dried or uncalcined pellets. Especially effective for increasing the strength of uncalcined pellets comprising mainly iron oxide is iron sulfate, which may be added in an amount of about 1 to 5% by weight of the final calcined pellet.

The extrusion of the paste of catalytic material may be carried out with any suitable apparatus and in any suitable manner, as long as the conditions are maintained for causing a rapid drying of the surface of the extruded material. Although many specific extrusion machines are suitable for use in the present invention, those illustrated in the following United States patents may be mentioned as examples: Bangs, 855,379; Frenkel, 2,341,213; Meakin, 2,065,141; Meakin, 2,075,450; Meakin, 2,124,744; Meakin, 2,167,900; Meakin, 2,171,039. In general, the paste is extruded through a perforated die-plate by the action of a rotary member which bears against the paste and forces it through the perforations. The extruded string or ribbon issuing from the perforations is cut into suitable lengths to form pellets by means of a cutting member, such as a blade or wire. The extrudate may be delivered in various suitable shapes which are obtainable by extrusion and which include round, semicircular, square, rectangular and other cross-sectional forms, dependent upon the shape of the perforations of the extrusion machine.

The rapid drying of the surface of the extrudate (i. e., without substantial drying of the body of the extrudate) may be accomplished by directing a stream of gas, preferably hot gas, against the extrudate as it emerges from the extrusion apparatus or by extruding a hot paste. In the former case the gas is preferably at a temperature of at least 80° C. The gas may be air, nitrogen, flue or exhaust gas, or the like. The amount of gas and the temperature thereof necessary to dry the surface of the extrudate sufficiently before it is cut into pellets is dependent upon the water content of the extrudate, the nature of the catalytic material insofar as it relates to the stickiness of the extrudate, the rate of extrusion, the rate of cutting the extrudate into pellets, etc. In general, an amount of gas is passed over the surface of the extrudate to cause said surfaces to become sufficiently dry before the extrudate is cut into pellets so that the pellets do not stick together or lose their individual shape. In other words, the surfaces of the extrudate are dried rapidly enough (e. g., in 1/20 to 5 seconds) to set the outer portion thereof into a non-sticking state before the pellets are cut therefrom. In general the pre-drying removes only about 5-25% of the water contained in the pellets.

In the second modification, the paste is heated to such a temperature that the surface of the extrudate dries at a rapid rate immediately upon issuing from the die. Thus the paste may be heated to a temperature of 60° C. to 100° C., preferably at least 80° C. either prior to introduction into the extrusion machine or by means of suitable heating facilities within the extrusion machine. The pellets may then be cut as the hot extrudate issues from the extruding machine without resort to the use of a blast of hot gas. Both methods may be used in conjunction. Thus a preferred method is to extrude the hot paste and at the same time to blast the extrudate with hot gas. This allows even greater concentrations of water to be used without danger of the pellets sticking.

The pellets are then further dried. Best results are obtained when the water content is reduced to 10% or lower before calcining. Drying temperatures of the order of 150° to 300° C. may be used. A tunnel drier in which the pellets are carried through a hot zone on a belt or apron conveyor is generally most suitable. There must be sufficient circulation of gases over the wet pellets in the drier to avoid condensation of moisture on the pellets, which condensation would make the pellets sticky.

The pellets may then be treated to convert the catalytic material into its proper activated form. Such treatment generally comprises calcination at a temperature of about 400° C.–700° C. for a sufficient time to develop the catalytic properties and to increase the strength of the pellets. Sometimes a mild reduction treatment is also given. Such calcination is usually applied to metal oxide catalysts. It has been found, however, that in the case of the catalysts of the described composition used under the described conditions, a much more drastic calcination treatment is advantageously applied and the selectivity of the catalyst is further improved thereby without appreciable loss of catalytic activity. Thus a preferred calcination treatment is at a temperature of about 900° C. to 975° C. for a period of ½ hour to 15 hours. Excessive temperatures, i. e., temperatures causing appreciable sintering or melting of the catalyst, are however to be avoided. This drastic heat treatment tends to cause some slight sintering and results in a decrease (usually small) of the available catalyst surface. In such cases where the uncalcined pellets or partially calcined pellets have a large available surface, the calcination is preferably carried out under coordinated conditions of temperature and time to yield calcined pellets having an available surface of not more than about 10 square meters per gram. When it is considered that such materials as microporous alumina, silica, etc., have available surfaces in the order of several hundred square meters per gram, it will be appreciated that the preferred, calcined catalysts used in the process of the invention are practically without microporous structure.

As illustrative of the process described, a catalyst was prepared in the following manner: Dry finely-divided red iron oxide ($Fe_2O_3$) of a pigment type and chromium oxide ($Cr_2O_3$) were thoroughly mixed and then an aqueous solution of potassium carbonate containing a trace of tannic acid was added to form a paste having a solid content consisting of 5% $Cr_2O_3$, 7% $K_2CO_3$, and the remainder $Fe_2O_3$ and a water content of 28.9% based on the metal oxides. This paste was too wet to extrude by the usual methods. However, it was extruded in an extrusion machine having a 2¾ inch diameter auger driven at 36 R. P. M., a die-plate containing 82 3/16 inch holes, and a single blade cutter attached to the auger shaft and adapted to cut the extrudate into pellets of about 3/16 of an inch in length. The angle between the cutter and the tip of the auger was adjusted so that the extrudate dried about 1-1.5 seconds prior to its being cut into pellets. A hot air blast was directed against the die-plate to dry the surfaces of the extrudates. The flow of air was around 40 cu. ft. per minute, the temperature of the air was about 120° C. and the maximum velocity of the air stream was about 150 feet per second. The pellets cut from the surface-dried extrudate did not stick together while the hot air stream was flowing but stuck together when the air blast was discontinued. The pellets so formed were dried and calcined at 930° C. for 12 hours. They were then sized and the proper size pellets measured for bulk density. This measurement is performed by repeated additions of catalyst pellets to a 100 cc. graduate, followed by tapping until the catalyst level remains at the 100 cc. mark, after which the sample is weighed. The bulk density thus obtained for the catalyst prepared in the above example was 1.08 g./cc. Since the absolute density was about 4.97, the bulk density ratio was about 0.217. This catalyst gave higher conversion efficiencies for dehydrogenation of butylene to butadiene under the described conditions than a catalyst of similar composition extruded in the usual manner.

As further illustrative of the present process, a series of experiments were carried out with moist mixtures of iron oxide ($Fe_2O_3$), containing 7% (by weight of solids) of $K_2CO_3$ and varying water contents. The mixtures were extruded in an extrusion device having a 1⅝ inch diameter auger, a die-plate having 24 3/16 inch openings, and a cutter attached to the auger shaft and adapted to cut 3/16 inch long pellets from the extrudate. In order to prevent sticking of the pellets as they were cut off, a blast of hot air was played on the face of the die-plate. The surface-dried pellets so formed were oven-dried and calcined for 2 hours at 900° C. The resulting catalytically active pellets were measured for bulk density as well as pellet density (i. e., the actual density of the individual pellets as measured by mercury displacement and weighing). The results of these measurements are shown in the following table, along with the pellet density ratios and the bulk density ratios:

| Catalyst No. | Percent by wt. $H_2O$ (based on metal oxides) | Bulk Density, g./cc. | Pellet Density, g./cc. | Bulk Density Ratio | Pellet Density Ratio |
|---|---|---|---|---|---|
| 1 | 31 | 0.96 | 1.98 | 0.193 | 0.398 |
| 2 | 31 | 0.98 | -------- | 0.197 | -------- |
| 3[1] | 31 | 0.97 | -------- | 0.195 | -------- |
| 4 | 36 | 0.89 | 1.81 | 0.179 | 0.364 |
| 5 | 41 | 0.82 | 1.64 | 0.165 | 0.330 |
| 6[2] | 41 | 0.87 | 1.66 | 0.175 | 0.334 |
| 7 | 46 | 0.80 | 1.59 | 0.161 | 0.320 |
| 8 | 51 | 0.81 | 1.52 | 0.163 | 0.306 |
| 9 | 56 | 0.75 | 1.64 | 0.151 | 0.330 |

[1] Contained 5% $Cr_2O_3$ in addition to other components.
[2] 0.3% tannic acid in mixture.

In the production of diolefins, the process of the invention is particularly advantageous for the production of butadiene by catalytic dehydrogenation of normal butylenes such, for instance, as the various commercial butylene fractions consisting essentially of butene-1 and/or butene-2. It is, however, also applicable and advantageous for the production of other diolefins and particularly conjugated diolefins, such as piperylene, isoprene, the various hexadienes, etc., from the corresponding monoolefins. Thus, the process may generally be applied for the production of diolefins from the corresponding monoolefins having at least four non-quaternary carbon atoms in a straight chain. The process of the invention involves the treatement of the olefins in the vapor phase at temperatures above about 580° C. In order to produce the corresponding diolefins more or less selectively, the olefins treated are therefore those which may be heated to temperatures above about 580° C. without substantial decomposition. Since the tendency for the various olefins to undergo thermal cracking increases with their molecular weights, preferred olefins to be treated are the lower olefins having from 4 to about 8 or 10 carbon atoms. The olefin to be dehydrogenated may be a single hydrocarbon or, if desired, a mixture of olefins may be dehydrogenated to produce a mixture of diolefins. Also, in some cases a single diolefin may be produced from a mixture of isomeric olefins. For example, butadiene may be produced from either butene-1 or butene-2 or a mixture of the two, and isoprene may be produced from methyl ethyl ethylene, trimethyl ethylene, or isopropyl ethylene, or a mixture of these olefins.

In order to facilitate the recovery of the diolefin and unconverted monoolefin from the product and for various other practical reasons, it is usually desirable that the feed consist essentially of the desired olefin or mixture of olefins. This is, however, not essential and in some cases it may be more advantageous to use olefin fractions comprising appreciable amounts of relatively inert diluents. Thus, for example, in the production of butadiene, a so-called butane-butylene fraction containing substantial amounts of butane may be used. The paraffin hydrocarbons are substantially unaffected under the prevailing conditions and may be considered as inert diluents. In this respect the process of the invention differs fundamentally from most of the known dehydrogenation processes which are much more suited for the dehydrogenation of paraffins than for the dehydrogenation of olefins and are totally incapable of selectively dehydrogenating olefins in the presence of paraffins.

In the dehydrogenation of alkyl aromatic hydrocarbons, the process is applicable for the dehydrogenation of various aromatic hydrocarbons having an alkyl side chain of at least 2 carbon atoms such as ethyl benzene, propyl benzene, diethyl benzene, ethyl toluene, propyl toluene, ethyl naphthalene, diethyl naphthalene, diethyl diphenyl and the like.

The dehydrogenation of these olefinic and alkyl aromatic materials is carried out in the vapor phase at temperatures above about 580° C. and preferably between about 600° C. and 700° C. Somewhat higher temperatures up to about 800° C. may be used, but are generally less suitable for various reasons. The dehydrogenation may be effected at any desired pressure. However, the partial pressure of the hydrocarbon reactant in the reaction zone is preferably not more than about ⅓ atmosphere. The low pressure of the reactant may be obtained by operating under diminishing pressure or by the use of a diluent while operating at normal pressure or superatmospheric pressure. Steam is a particularly good diluent in most cases and is preferably employed in large amounts, for example between 5 and 30 mols of steam per mol of hydrocarbon feed. The contact time is adjusted by the rate of flow to afford the desired degree of conversion. In general, flow rates of reactant corresponding to gaseous hourly space velocities (measured at standard conditions) between about 300 and 3000 may be employed. The conversion (i. e. percent of reactant feed which undergoes reaction in a single pass) is preferably at least 20% and in the case of diolefin production is preferably below about 60%.

This application is a continuation-in-part of copending application Serial Number 551,421, filed August 26, 1944.

The following claims specify the use of the above-described catalyst produced by extrusion of a sticky paste. It is to be pointed out that the pastry consistency of the material is developed or increased by mixing, mulling, or kneading the mixture provided that the specified amount of water is present. The mixing or working of the material to produce a sticky paste may be done exterior to the extrusion machine or may take place in the extrusion machine. In any case the material is a sticky paste before it passes through the die of the extrusion machine.

The invention claimed is:

1. In a process for a dehyrogenation of a hydrocarbon at a temperature above 580° C. in the presence of added steam with a steam-stable dehydrogenation catalyst, the improvement which comprises contacting the vapors of the hydrocarbon to be dehydrogenated together with added steam under said temperature conditions with pellets of an alkali-promoted iron oxide containing catalyst prepared by forming a paste of the powdered catalyst ingredients and water, extruding the paste to form pellets, drying the pellets, and calcining them at a temperature between about 900° C. and 975° C. to activate and strengthen them and reduce the available surface to below about 10 square meters per gram, the amount of water used in forming said paste being sufficient that the catalyst pellets have an apparent density below 0.520 of the absolute density.

2. In a process for the dehydrogenation of butylene to butadiene at a temperature of 580° C. in the presence of added steam with a steam-stable dehydrogenation catalyst, the improvement which comprises contacting the buylene to be dehydrogenated together with added steam under said temperature conditions with pellets of an iron oxide catalyst stabilized with chromium oxide and promoted with potassium oxide, prepared by forming a paste of the powdered catalyst ingredients and water, extruding the paste to form pellets, drying the pellets and calcining them at a temperature between about 900° C. and 975° C. to activate and strengthen them and reduce the available surface to below about 10 square meters per gram, the amount of water used in forming said paste being sufficient that the catalyst pellets have an apparent density below 0.520 of the absolute density.

3. In a process for the dehydrogenation of a hydrocarbon at a temperature above about 580° C. in the presence of added steam with a steam-stable dehydrogenation catalyst, the improvement which comprises contacting the vapors of the hydrocarbons to be dehydrogenated together with added steam under said temperature conditions with pellets of an alkali-promoted iron oxide catalyst having an apparent density below 0.520 of the absolute density and an available surface of less than about 10 square meters per gram.

4. In a process for the dehydrogenation of butylene to butadiene at a temperature of about 580° C. in the presence of added steam with a steam-stable dehydrogenation catalyst, the improvement which comprises contacting vapors of the butylene to be dehydrogenated together with added steam under said temperature conditions with a potassium-promoted iron oxide catalyst having an apparent density below 0.520 of the absolute density and an available surface of less than about 10 square meters per gram.

ELWYN P. DAVIES.
FRANK T. EGGERTSEN.

REFERENCES CITED

The following references are of record in the file of this patent:

UNITED STATES PATENTS

| Number | Name | Date |
| --- | --- | --- |
| 1,752,692 | Ramage | Apr. 1, 1930 |
| 2,036,752 | Herzog et al. | Apr. 7, 1936 |
| 2,327,189 | Ipatieff et al. | Aug. 17, 1943 |
| 2,370,797 | Kearby | Mar. 6, 1945 |
| 2,370,798 | Kearby | Mar. 6, 1945 |
| 2,377,083 | Kearby | May 29, 1945 |
| 2,383,643 | Fulton et al. | Aug. 28, 1945 |
| 2,395,875 | Kearby | Mar. 5, 1946 |
| 2,395,876 | Kearby | Mar. 5, 1946 |
| 2,408,146 | Kearby | Sept. 24, 1946 |